United States Patent
Messina et al.

(10) Patent No.: US 10,676,827 B2
(45) Date of Patent: Jun. 9, 2020

(54) METHODS FOR MAKING MULTILAYER TUBULAR ARTICLES

(71) Applicant: SOLVAY SPECIALTY POLYMERS ITALY S.P.A., Bollate (IT)

(72) Inventors: Nicasio Edoardo Messina, Zerbolo (IT); Marco Colladon, Breda di Piave (IT); Paula Cojocaru, Legnano (IT); Vincenzo Arcella, Nerviano (IT); Marco Apostolo, Senago (IT); Francesco Maria Triulzi, Garbagnate Milanese (IT)

(73) Assignee: SOLVAY SPECIALITY POLYMERS ITALY S.P.A., Bollate (MI) (IT)

( * ) Notice: Subject to any disclaimer, the term of this patent is extended or adjusted under 35 U.S.C. 154(b) by 49 days.

(21) Appl. No.: 15/536,127

(22) PCT Filed: Dec. 18, 2015

(86) PCT No.: PCT/EP2015/080565
§ 371 (c)(1),
(2) Date: Jun. 14, 2017

(87) PCT Pub. No.: WO2016/097329
PCT Pub. Date: Jun. 23, 2016

(65) Prior Publication Data
US 2017/0362714 A1 Dec. 21, 2017

(51) Int. Cl.
*C23C 18/22* (2006.01)
*F16L 58/08* (2006.01)
*E21B 17/10* (2006.01)
*C23C 18/16* (2006.01)
*C23C 18/20* (2006.01)
*C23C 18/32* (2006.01)
*C23C 18/31* (2006.01)
*E21B 17/01* (2006.01)
*F16L 11/04* (2006.01)

(52) U.S. Cl.
CPC ............ *C23C 18/22* (2013.01); *C23C 18/165* (2013.01); *C23C 18/1653* (2013.01); *C23C 18/20* (2013.01); *C23C 18/2006* (2013.01); *C23C 18/31* (2013.01); *C23C 18/32* (2013.01); *E21B 17/01* (2013.01); *E21B 17/1085* (2013.01); *F16L 58/08* (2013.01); *F16L 11/04* (2013.01); *F16L 2011/047* (2013.01)

(58) Field of Classification Search
CPC ... C23C 18/22; C23C 18/165; C23C 18/1653; C23C 18/29; C23C 18/2996; C23C 18/31; C23C 18/32; E21B 17/01; E21B 17/1085; F16L 58/08; F16L 11/04; F16L 11/047

USPC .......................................................... 138/40
See application file for complete search history.

(56) References Cited

U.S. PATENT DOCUMENTS

| | | | | |
|---|---|---|---|---|
| 3,860,507 A | * | 1/1975 | Vossen, Jr. ............... | H01J 37/34 204/192.12 |
| 5,476,121 A | | 12/1995 | Yoshikawa et al. | |
| 6,176,268 B1 | | 1/2001 | Hsieh et al. | |
| 8,430,169 B2 | * | 4/2013 | Stoisits .................... | E21B 37/06 137/7 |
| 9,580,972 B2 | * | 2/2017 | Cappeln .................. | E21B 17/01 |
| 2006/0083882 A1 | * | 4/2006 | Schmitz ............. | A22C 13/0013 428/36.91 |
| 2006/0127621 A1 | * | 6/2006 | Sato ........................ | B32B 1/08 428/36.91 |
| 2007/0098941 A1 | * | 5/2007 | Fish, Jr. .................... | B32B 1/08 428/36.91 |
| 2008/0014397 A1 | * | 1/2008 | Manai ...................... | B32B 1/08 428/36.9 |
| 2008/0210329 A1 | * | 9/2008 | Quigley ................. | F16L 11/083 138/127 |
| 2011/0240304 A1 | * | 10/2011 | Waldron .............. | B21K 25/005 166/345 |
| 2012/0088110 A1 | * | 4/2012 | Elia .......................... | C23C 18/22 428/458 |
| 2012/0279575 A1 | * | 11/2012 | Tronc ..................... | F16L 11/083 137/1 |
| 2013/0247996 A1 | * | 9/2013 | Tronc ........................ | B32B 1/08 137/1 |

FOREIGN PATENT DOCUMENTS

| | | |
|---|---|---|
| DE | 3104161 A1 | 8/1982 |
| FR | 2268847 A | 11/1975 |
| FR | 2731767 A1 | 9/1996 |
| GB | 1570380 A | 7/1980 |
| JP | H04-131581 A | 5/1992 |
| JP | 2001-108163 A | 4/2001 |
| JP | 2012-149722 A | 8/2012 |
| WO | 2009045433 A1 | 4/2009 |
| WO | 2013108036 A2 | 7/2013 |

OTHER PUBLICATIONS

Alger, Mark S.M., "Polymer Science Dictionary", 1989, London School of Polymer Technology, Polytechnic of North London, UK published by Elsevier Applied Science, p. 476.

* cited by examiner

*Primary Examiner* — Craig M Schneider
*Assistant Examiner* — David R Deal

(57) ABSTRACT

The present invention pertains to a multilayer tubular article, to processes for the manufacture of said multilayer tubular article and to uses of said multilayer tubular article in upstream applications for conveying hydrocarbons from a well to a floating off-shore unit via a bottom platform.

16 Claims, No Drawings

METHODS FOR MAKING MULTILAYER TUBULAR ARTICLES

This application is a U.S. national stage entry under 35 U.S.C. § 371 of International Application No. PCT/EP2015/080565 filed Dec. 18, 2015, which claims priority to European application No. EP 14199113.3 filed on Dec. 19, 2014. The entire contents of these applications are explicitly incorporated herein by this reference.

TECHNICAL FIELD

The present invention pertains to a multilayer tubular article, to processes for the manufacture of said multilayer tubular article and to uses of said multilayer tubular article in upstream applications for conveying hydrocarbons from a well to a floating off-shore unit via a bottom platform.

BACKGROUND ART

Off-shore pipelines such as those used to pump crude oil and natural gas ashore from off-shore drilling rigs and terminals are required to be capable of withstanding very high pressures and temperatures and are therefore typically made of metals such as iron and steel.

However, among major issues encountered with steel pipelines in general is the problem of corrosion.

In order to protect the inner bore of the pipelines from the corrosive effects of materials passing through them, such as mixtures of hydrocarbons, water and other contaminants, e.g. carbon dioxide and hydrogen sulphide, it has been already proposed to provide pipelines made of a suitable polymeric material.

Flexible pipes for conveying hydrocarbons are already well known and generally comprise, from the inside of the pipe outward, a metal carcass covered by a polymer internal sealing sheath, a pressure armour layer, tensile armour layers and a polymer external sheath to protect the entire pipe and in particular to prevent seawater from penetrating its thickness. The metal carcass and the pressure armour layer are usually made up of longitudinal elements wound with a short pitch and give the pipe its ability to withstand radial force while the tensile armour layers usually consist of metal wires wound at long pitches in order to react axial forces.

Polyvinylidene fluoride (PVDF) has been proposed as a material for manufacturing such internal sealing sheath on account of its chemical resistance to hydrocarbons at temperatures typically between 100° C. and 130° C.

Under operating temperatures and pressures, carbon dioxide and hydrogen sulphide contained in the hydrocarbons permeate through the polymer internal sealing sheath into the tensile armour layers and, in the presence of water vapour, cause corrosion of these metal reinforcements. These phenomena can impact mechanical performance of the pipe, particularly in ultra-deepwater applications.

Sour service steel grades for the pressure armour layers and the tensile armour layers are thus nowadays used.

However, such steel grades have the drawbacks of being expensive or of having poor mechanical properties, which imposes an increase in the section and the weight of the metal portions in these pipes.

Moreover, under operating temperatures and pressures, some of the gases and low-density fractions of the hydrocarbon fluids permeate through the polymer internal sealing sheath into the voids of the metal reinforcements. During decompression following production stoppage, should the pressure in the pipe reduce rapidly, these gases and low-density fractions of the hydrocarbon fluids will expand, possibly causing blistering and collapse of the internal sealing sheath.

SUMMARY OF INVENTION

It has been now found that by using the multilayer tubular article of the present invention it is possible to halt the spread of corrosive carbon dioxide and hydrogen sulphide thereby allowing use of sweet service steel grades with reduced thickness for the pressure armour layers and the tensile armour layers and thus lowering both the weight and the overall cost of the multilayer tubular article. Additionally, the multilayer tubular article of the present invention makes it possible to design either flexible pipes or pipe liners for downhole pipes for longer-lasting sour services in upstream applications for conveying hydrocarbons with high content of corrosive carbon dioxide and hydrogen sulphide.

In particular, it has been found that the multilayer tubular article of the present invention successfully exhibits, even at high temperatures, outstanding interlayer adhesion strength and low permeability to water vapour and to gases.

In particular, it has been found that the multilayer tubular article of the present invention successfully exhibits, even at high temperatures, low permeability to gases such as carbon dioxide and hydrogen sulphide to be suitably used in upstream applications.

In a first instance, the present invention pertains to a multilayer tubular article comprising:
- a tube comprising, preferably consisting of, at least one concentric layer [layer (Pc)] consisting of a composition [composition (P)] comprising, preferably consisting of, at least one thermoplastic polymer [polymer (T)], said tube having an inner surface and an outer surface, and
- adhered to at least a portion of at least one of the inner surface and the outer surface of said tube, at least one concentric layer [layer (Mc)] consisting of a composition [composition (M)] comprising, preferably consisting of, at least one metal compound comprising one or more metals [compound (M)].

For the purpose of the present invention, the term "thermoplastic" is intended to denote linear polymers existing, at room temperature, below their glass transition temperature, if they are amorphous, or below their melting point, if they are semi-crystalline. These polymers have the property of becoming soft when they are heated and of becoming rigid again when they are cooled, without there being an appreciable chemical change. Such a definition may be found, for example, in the encyclopaedia called Polymer Science Dictionary. Edited by MARK S. M. ALGER. LONDON: ELSEVIER APPLIED SCIENCE, 1989. p. 476.

The polymer (T) is typically selected from the group consisting of fluoropolymers [polymers (F)], crosslinkable polyolefins comprising one or more silane groups [polymers (PO)], polyamides [polymers (PA)], poly(aryl ether ketone) polymers [polymers (PAEK)] and poly(arylene sulfide) polymer [polymers (PAS)].

For the purpose of the present invention, the term "fluoropolymer [polymer (F)]" is intended to denote a polymer comprising, preferably consisting of, recurring units derived from at least one fluorinated monomer [monomer (F)] and, optionally, at least one hydrogenated monomer [monomer (H)].

By the term "fluorinated monomer [monomer (F)]" it is hereby intended to denote an ethylenically unsaturated monomer comprising at least one fluorine atom and, optionally, at least one hydrogen atom.

By the term "hydrogenated monomer [monomer (H)]" it is hereby intended to denote an ethylenically unsaturated monomer comprising at least one hydrogen atom and free from fluorine atoms.

The term "at least one fluorinated monomer" is understood to mean that the polymer (F) may comprise recurring units derived from one or more than one fluorinated monomers. In the rest of the text, the expression "fluorinated monomers" is understood, for the purposes of the present invention, both in the plural and the singular, that is to say that they denote both one or more than one fluorinated monomers as defined above.

The term "at least one hydrogenated monomer" is understood to mean that the polymer (F) may comprise recurring units derived from one or more than one hydrogenated monomers. In the rest of the text, the expression "hydrogenated monomers" is understood, for the purposes of the present invention, both in the plural and the singular, that is to say that they denote both one or more than one hydrogenated monomers as defined above.

The polymer (F) is typically obtainable by polymerization of at least one fluorinated monomer [monomer (F)] and, optionally, at least one hydrogenated monomer [monomer (H)].

Non-limiting examples of suitable monomers (F) include, notably, the followings:

$C_2$-$C_8$ perfluoroolefins such as tetrafluoroethylene and hexafluoropropylene, $C_2$-$C_8$ hydrogenated fluoroolefins such as vinylidene fluoride, vinyl fluoride, 1,2-difluoroethylene and trifluoroethylene, perfluoroalkylethylenes of formula $CH_2$=CH—$R_{f0}$ wherein $R_{f0}$ is a $C_1$-$C_6$ perfluoroalkyl, chloro- and/or bromo- and/or iodo-$C_2$-$C_6$ fluoroolefins such as chlorotrifluoroethylene, (per)fluoroalkylvinylethers of formula $CF_2$=$CFOR_{f1}$ wherein $R_{f1}$ is a $C_1$-$C_6$ fluoro- or perfluoroalkyl group, e.g. $CF_3$, $C_2F_5$, $C_3F_7$, $CF_2$=$CFOX_0$ (per)fluoro-oxyalkylvinylethers wherein $X_0$ is a $C_1$-$C_{12}$ alkyl group, a $C_1$-$C_{12}$ oxyalkyl group or a $C_1$-$C_{12}$ (per)fluorooxyalkyl group having one or more ether groups, such as perfluoro-2-propoxy-propyl group, (per)fluoroalkylvinylethers of formula $CF_2$=$CFOCF_2OR_{f2}$ wherein $R_{f2}$ is a $C_1$-$C_6$ fluoro- or perfluoroalkyl group, e.g. $CF_3$, $C_2F_5$, $C_3F_7$ or a $C_1$-$C_6$ (per)fluorooxyalkyl group having one or more ether groups such as —$C_2F_5$—O—$CF_3$, functional (per)fluoro-oxyalkylvinylethers of formula $CF_2$=$CFOY_0$ wherein $Y_0$ is a $C_1$-$C_{12}$ alkyl group or (per)fluoroalkyl group, a $C_1$-$C_{12}$ oxyalkyl group or a $C_1$-$C_{12}$ (per)fluorooxyalkyl group having one or more ether groups and $Y_0$ comprising a carboxylic or sulfonic acid group, in its acid, acid halide or salt form, and fluorodioxoles, preferably perfluorodioxoles.

The polymer (F) is preferably selected from the group consisting of:

polymers (F-1) comprising recurring units derived from vinylidene fluoride (VDF) and, optionally, at least one monomer (F) different from VDF, polymers (F-2) comprising recurring units derived from at least one monomer (F) selected from tetrafluoroethylene (TFE) and chlorotrifluoroethylene (CTFE), at least one monomer (H) selected from ethylene (E), propylene and isobutylene and, optionally, at least one monomer (F) different from said TFE and/or ECTFE, typically in an amount of from 0.01% to 30% by moles, based on the total amount of TFE and/or CTFE and said monomer (H), and polymers (F-3) comprising recurring units derived from tetrafluoroethylene (TFE) and at least one monomer (F) selected from the group consisting of perfluoroalkylvinylethers of formula $CF_2$=$CFOR_{f1'}$, wherein $R_{f1'}$ is a $C_1$-$C_6$ perfluoroalkyl group, and $C_3$-$C_8$ perfluoroolefins such as hexafluoropropylene (HFP).

The polymer (F-1) preferably comprises:
(a) at least 60% by moles, preferably at least 70% by moles, more preferably at least 80% by moles of vinylidene fluoride (VDF), and
(b) optionally, from 0.1% to 40% by moles, preferably from 0.1% to 30% by moles, more preferably from 0.1% to 20% by moles, based on the total amount of monomers (a) and (b), of at least one monomer (F) selected from the group consisting of vinyl fluoride ($VF_1$), chlorotrifluoroethylene (CTFE), hexafluoropropylene (HFP), tetrafluoroethylene (TFE), trifluoroethylene (TrFE) and perfluoromethylvinylether (PMVE).

The polymer (F-1) may further comprise from 0.1% to 5% by moles, preferably from 0.1% to 3% by moles, more preferably from 0.1% to 1% by moles, based on the total amount of monomers (a) and (b), of at least one monomer (H).

The polymer (F-1) is preferably selected from the group consisting of homopolymers of VDF, VDF/TFE copolymers, VDF/TFE/HFP copolymers, VDF/TFE/CTFE copolymers, VDF/TFE/TrFE copolymers, VDF/CTFE copolymers, VDF/HFP copolymers, VDF/TFE/HFP/CTFE copolymers, VDF/TFE/perfluorobutenoic acid copolymers, VDF/TFE/maleic acid copolymers and the like.

The polymer (F-1) is more preferably selected from the group consisting of homopolymers of VDF and copolymers of VDF with 0.1% to 10% by moles of a fluorinated comonomer selected from the group consisting of chlorotrifluoroethylene (CTFE), hexafluoropropene (HFP), tetrafluoroethylene (TFE), trifluoroethylene (TrFE) and mixtures thereof.

The polymer (F-1) typically has a melting point of at least 120° C., preferably of at least 135° C., more preferably of at least 150° C.

The polymer (F-1) typically has a melting point of at most 190° C., preferably of at most 185° C., more preferably of at most 180° C.

The melting point was measured by Differential Scanning Calorimetry (DSC), at a heating rate of 10° C./min, according to ASTM D 3418.

The polymer (F-1) typically has a heat of fusion of at least 10 J/g, preferably of at least 20 J/g.

The polymer (F-1) typically has a heat of fusion of at most 70 J/g, preferably of at most 40 J/g, more preferably of at most 30 J/g.

The heat of fusion was measured by Differential Scanning Calorimetry (DSC), at a heating rate of 10° C./min, according to ASTM D 3418.

Polymers (F-2) wherein the monomer (FX) is chlorotrifluoroethylene (CTFE) will be identified herein below as ECTFE copolymers; polymers (F-2) wherein the monomer (FX) is tetrafluoroethylene (TFE) will be identified herein below as ETFE copolymers.

The polymer (F-2) preferably comprises:
(a') from 10% to 90% by moles, preferably from 30% to 70% by moles of at least one monomer (FX) selected from the group consisting of chlorotrifluoroethylene (CTFE) and tetrafluoroethylene (TFE), and (b') from 10% to 90% by moles, preferably from 30% to 70% by moles, based on the total amount of monomers (a') and (b'), of ethylene (E).

The polymer (F-2) more preferably comprises, even more preferably consists of:

(a') from 50% to 70% by moles, preferably from 53% to 65% by moles of at least one monomer (FX) selected from the group consisting of chlorotrifluoroethylene (CTFE) and tetrafluoroethylene (TFE), and (b') from 30% to 50% by moles, preferably from 35% to 47% by moles, based on the total amount of monomers (a') and (b'), of ethylene (E).

The polymer (F-2) may further comprise from 0.1% to 30% by moles, preferably from 0.1% to 15% by moles, more preferably from 0.1% to 10% by moles, based on the total amount of monomers (a') and (b'), of at least one other monomer selected from the group consisting of monomers (F) and monomers (H).

Nevertheless, ECTFE polymers free from other monomers are preferred.

End chains, defects or minor amounts of monomer impurities leading to recurring units different from those above mentioned can be still comprised in the preferred ECTFE, without affecting properties of the material.

The polymer (F-2) typically has a melting point of at least 120° C., preferably of at least 130° C., more preferably of at least 140° C., even more preferably of at least 150° C.

The polymer (F-2) typically has a melting point of at most 210° C., preferably of at most 200° C., more preferably of at most 195° C., even more preferably of at most 190° C.

The melting point was measured by Differential Scanning Calorimetry (DSC), at a heating rate of 10° C./min, according to ASTM D 3418.

The polymer (F-2) typically has a heat of fusion of at least 1 J/g, preferably of at least 2 J/g, more preferably of at least 5 J/g.

The polymer (F-2) typically has a heat of fusion of at most 35 J/g, preferably of at most 30 J/g, more preferably of at most 25 J/g.

The heat of fusion was measured by Differential Scanning Calorimetry (DSC), at a heating rate of 10° C./min, according to ASTM D 3418.

The polymer (F-2) typically has a melt flow rate of from 0.01 to 75 g/10 min, preferably of from 0.1 to 50 g/10 min, more preferably of from 0.5 to 30 g/10 min, as measured according to ASTM 3275-81 standard procedure at 230° C. under a load of 2.16 Kg.

The polymer (F-3) is preferably a polymer (F-3A) comprising recurring units derived from tetrafluoroethylene (TFE) and at least one perfluoroalkylvinylether selected from the group consisting of perfluoromethylvinylether of formula $CF_2=CFOCF_3$, perfluoroethylvinylether of formula $CF_2=CFOC_2F_5$ and perfluoropropylvinylether of formula $CF_2=CFOC_3F_7$.

The polymer (F-3) typically has a melting point comprised between 200° C. and 320° C.

The melting point was measured by Differential Scanning Calorimetry (DSC), at a heating rate of 10° C./min, according to ASTM D 3418.

Non-limiting examples of suitable polymers (F-3) include, notably, those commercially available under the trademark name HYFLON® PFA P and M series and HYFLON® MFA from Solvay Specialty Polymers Italy S.p.A.

The polymer (PO) is typically obtainable by copolymerization or grafting of a polyolefin resin in the presence of a vinyl alkoxy silane.

The polymer (PO) typically comprises one or more polyolefin chains comprising one or more silane groups of formula —Si—O—X, wherein X is a hydrogen atom or an alkyl group, which, after hydrolysis and/or condensation, are capable of crosslinking by forming —Si—O—Si— links between the polyolefin chains.

The polymer (PO) is preferably a polyethylene comprising one or more silane groups [polymer (PE)].

The polymer (PO) typically has a melt flow rate comprised between 0.1 g/10 min and 50 g/10 min, as measured according to ASTM D1238 standard procedure at 190° C. under a load of 2.16 Kg.

The crosslinkable polymer (PO) preferably has a standard density comprised between 860 kg/m³ and 960 kg/m³, preferably between 860 kg/m³ and 880 kg/m³.

The standard density was measured according to ASTM D792-08 standard procedure (method B, absolute ethanol).

For the purpose of the invention, the term "poly(aryl ether ketone) polymer [polymer (PAEK)]" is intended to denote any polymer comprising recurring units wherein more than 50% by moles of said recurring units are recurring units ($R_{PAEK}$) comprising a Ar—C(O)—Ar' group, wherein Ar and Ar', equal to or different from each other, are aromatic moieties comprising at least one aromatic mono- or polynuclear cycle. The recurring units ($R_{PAEK}$) are generally selected from the group consisting of those of formulae (J-A) to (J-O) here below:

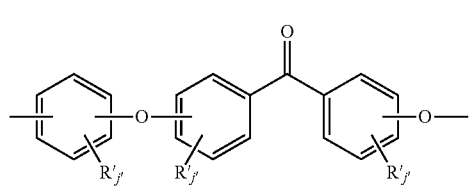
(J-A)

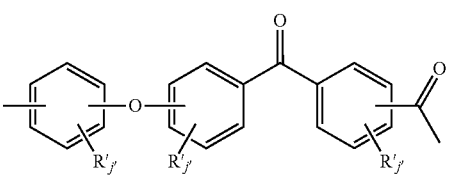
(J-B)

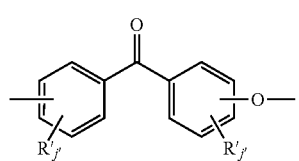
(J-C)

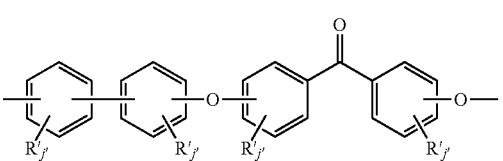
(J-D)

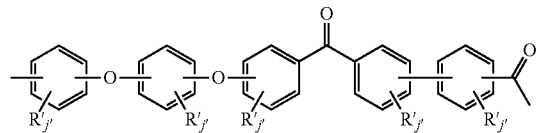 (J-E)
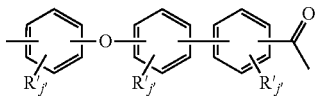 (J-F)
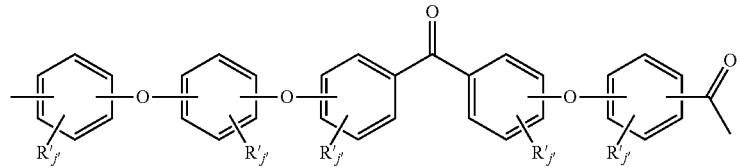 (J-G)
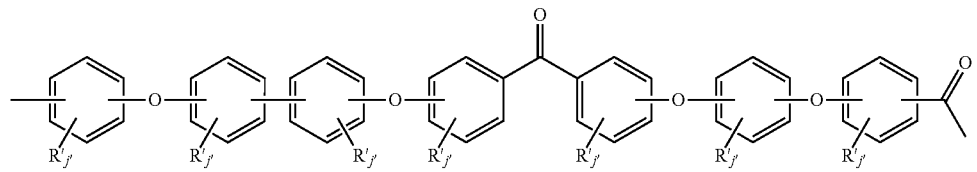 (J-H)
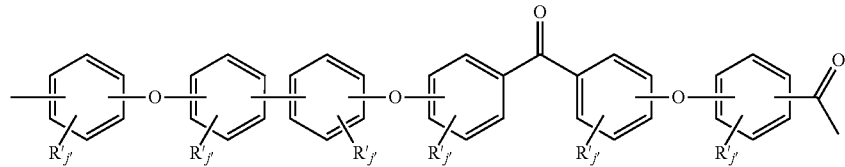 (J-I)
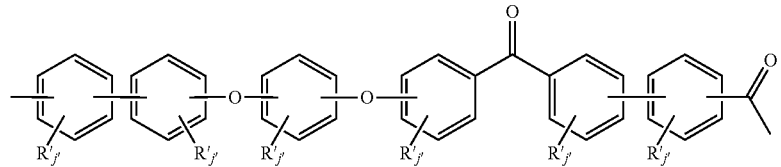 (J-J)
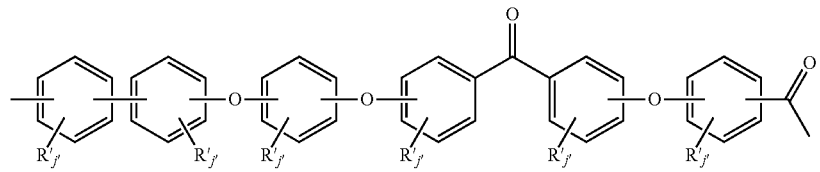 (J-K)
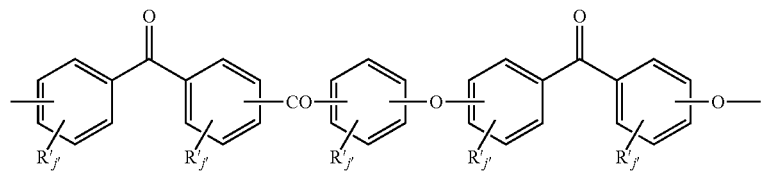 (J-L)
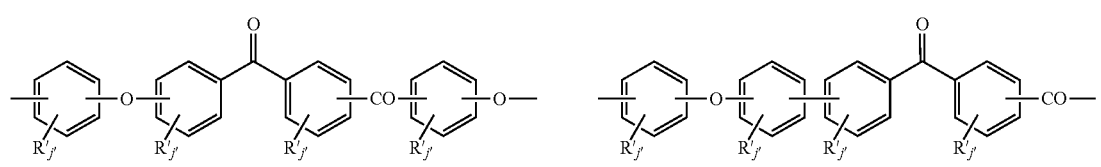 (J-M) (J-N)

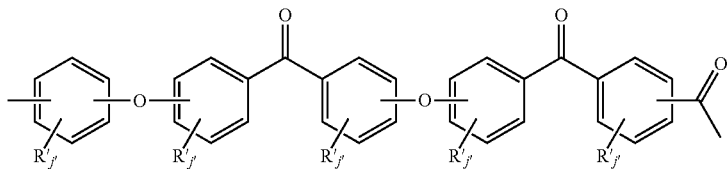
(J-O)

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or an integer from 1 to 4.

In recurring units ($R_{PAEK}$), the respective phenylene moieties may independently have 1,2-, 1,4- or 1,3-linkages to the other moieties different from R' in the recurring units. Preferably, said phenylene moieties have 1,3- or 1,4-linkages, more preferably they have 1,4-linkages.

Still, in recurring units ($R_{PAEK}$), j' can be at each occurrence zero, that is to say that the phenylene moieties have no other substituents than those enabling linkage in the main chain of the polymer (PAEK).

Preferred recurring units ($R_{PAEK}$) are thus selected from the group consisting of those of formulae (J'-A) to (J'-O) here below:

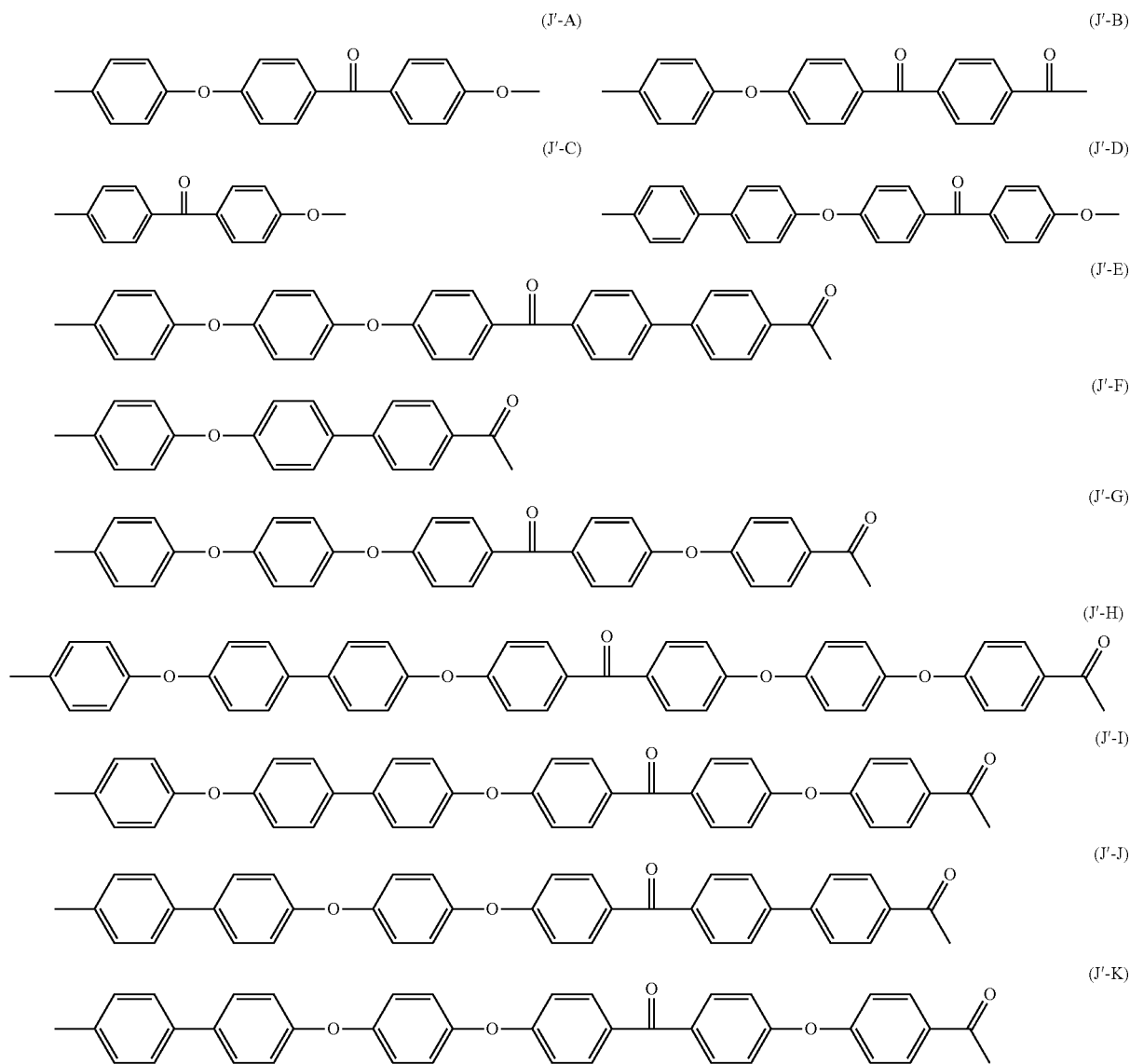

-continued

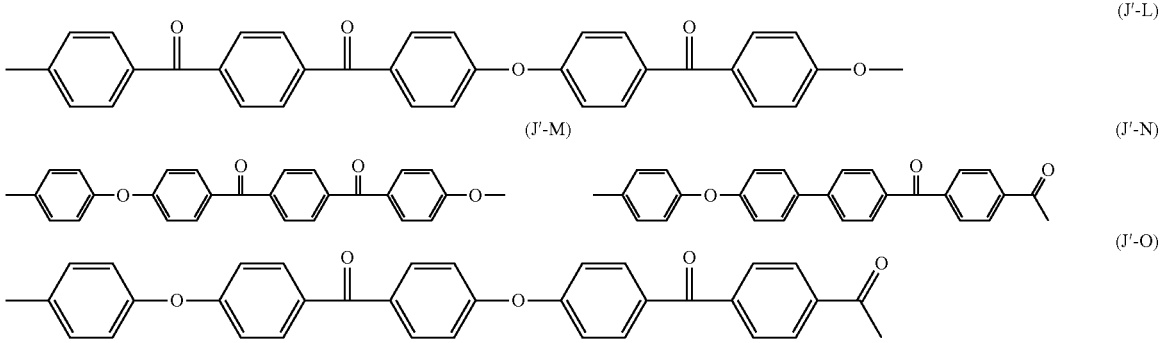

In the polymer (PAEK), as defined above, preferably more than 60% by moles, more preferably more than 80% by moles, even more preferably more than 90% by moles of the recurring units are recurring units ($R_{PAEK}$) as defined above.

Still, it is generally preferred that substantially all recurring units of the polymer (PAEK) are recurring units ($R_{PAEK}$) as defined above; chain defects or minor amounts of other recurring units might be present, being understood that these latter do not substantially modify the properties of recurring units ($R_{PAEK}$).

The polymer (PAEK) may be notably a homopolymer or a copolymer such as a random, alternate or block copolymer. When the polymer (PAEK) is a copolymer, it may notably contain (i) recurring units ($R_{PAEK}$) of at least two different formulae chosen from formulae (J-A) to (J-O), or (ii) recurring units ($R_{PAEK}$) of one or more formulae (J-A) to (J-O) and recurring units (R*PAEK) different from recurring units ($R_{PAEK}$).

As will be detailed later on, the polymer (PAEK) may be a poly(ether ether ketone) polymer [polymer (PEEK)]. For the purpose of the present invention, the term "poly(ether ether ketone) polymer [polymer (PEEK)]" is intended to denote any polymer comprising recurring units wherein more than 50% by moles of said recurring units are recurring units ($R_{PAEK}$) of formula J'-A.

Preferably more than 75% by moles, more preferably more than 85% by moles, even more preferably more than 95% by moles, still more preferably more than 99% by moles of the recurring units of the polymer (PEEK) are recurring units ($R_{PAEK}$) of formula J'-A. Most preferably, all the recurring units of the polymer (PEEK) are recurring units ($R_{PAEK}$) of formula J'-A.

Non limitative examples of polymers (PAEK) suitable for the invention include those commercially available under the trademark name KETASPIRE® PEEK from Solvay Specialty Polymers USA L.L.C.

For the purpose of the present invention, the term "poly (arylene sulfide) polymer [polymer (PAS)]" is intended to denote any polymer comprising recurring units wherein more than 50% by moles of said recurring units are recurring units ($R_{PAS}$) of formula:

—(Ar—S)— wherein Ar denotes an aromatic moiety comprising at least one aromatic mono- or poly-nuclear cycle, such as a phenylene or a naphthylene group, which is linked by each of its two ends to two sulfur atoms forming sulfide groups via a direct C—S linkage.

In recurring units ($R_{PAS}$), the aromatic moiety Ar may be substituted by one or more substituent groups, including but not limited to halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains.

The polymer (PAS) preferably comprises more than 70% by moles, more preferably more than 80% by moles, still more preferably more than 90% by moles of recurring units ($R_{PAS}$).

Most preferably, the polymer (PAS) contains no recurring units other than recurring units ($R_{PAS}$).

In recurring units ($R_{PAS}$), the aromatic moiety Ar is preferably selected from the group consisting of those of formulae (X-A) to (X-K) here below:

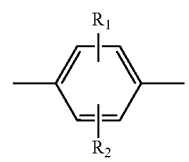

(X-A)

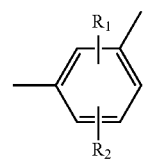

(X-B)

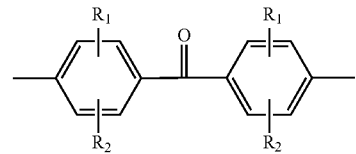

(X-C)

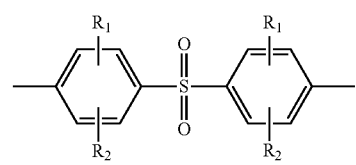

(X-D)

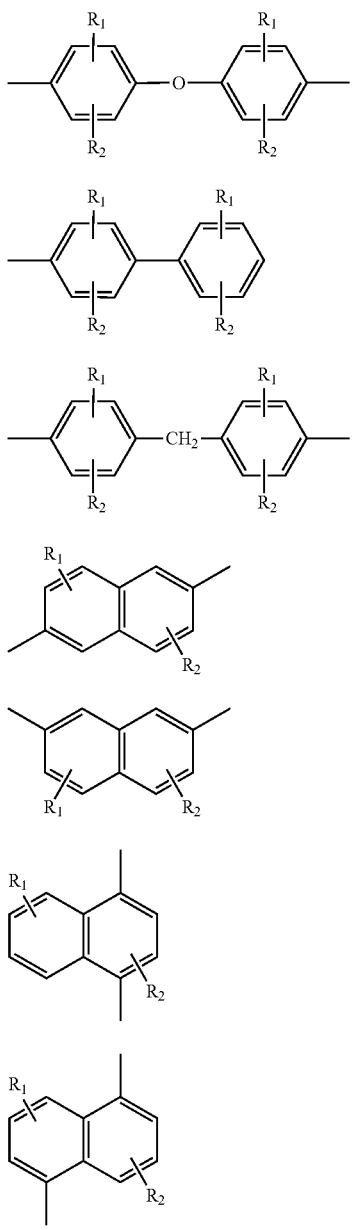

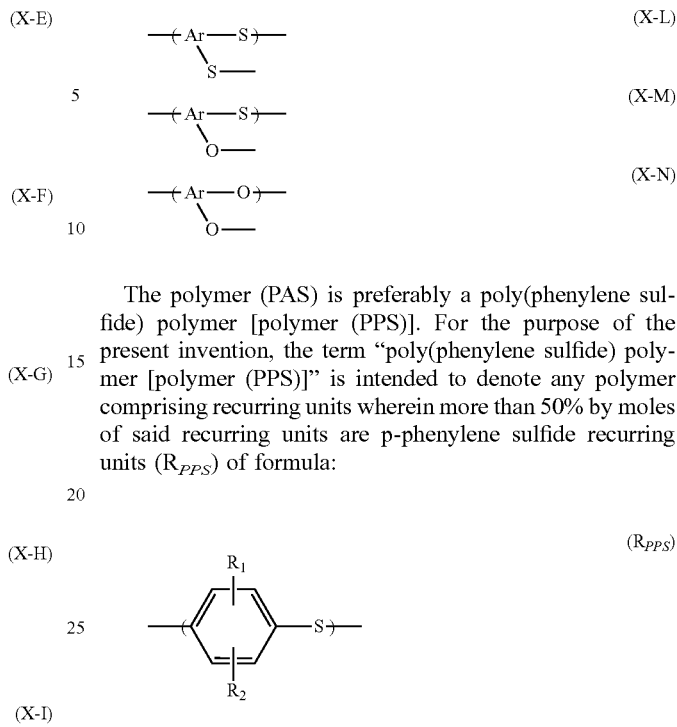

wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains.

The polymer (PAS) may be a homopolymer or a copolymer such as a random copolymer or a block copolymer.

The polymer (PAS) typically comprises one or more branched or cross-linked recurring units selected from the group consisting of those of formulae (X-L) to (X-N) here below:

The polymer (PAS) is preferably a poly(phenylene sulfide) polymer [polymer (PPS)]. For the purpose of the present invention, the term "poly(phenylene sulfide) polymer [polymer (PPS)]" is intended to denote any polymer comprising recurring units wherein more than 50% by moles of said recurring units are p-phenylene sulfide recurring units ($R_{PPS}$) of formula:

wherein the p-phenylene group is linked by each of its two ends to two sulfur atoms forming sulfide groups via a direct C—S linkage, wherein $R_1$ and $R_2$, equal to or different from each other, are selected from the group consisting of hydrogen atoms, halogen atoms, $C_1$-$C_{12}$ alkyl groups, $C_7$-$C_{24}$ alkylaryl groups, $C_7$-$C_{24}$ aralkyl groups, $C_6$-$C_{24}$ arylene groups, $C_1$-$C_{12}$ alkoxy groups, and $C_6$-$C_{18}$ aryloxy groups, and substituted or unsubstituted arylene sulfide groups, the arylene groups of which are also linked by each of their two ends to two sulfur atoms forming sulfide groups via a direct C—S linkage thereby creating branched or cross-linked polymer chains.

Non-limiting examples of polymers (PPS) suitable for the invention include those commercially available under the trademark names PRIMEF® from Solvay Specialty Polymers USA L.L.C., RYTON® from Chevron Phillips Chemical Company L.L.C., FORTRON® from Fortron Industries and SUPEC® from GE Plastics.

The compound (M) typically comprises one or more metals selected from the group consisting of Rh, Ir, Ru, Ti, Re, Os, Cd, Tl, Pb, Bi, In, Sb, Al, Ti, Cu, Ni, Pd, V, Fe, Cr, Mn, Co, Zn, Mo, W, Ag, Au, Pt, Ir, Ru, Pd, Sn, Ge, Ga, alloys thereof and derivatives thereof.

The compound (M) preferably comprises one or more metals selected from the group consisting of Ni, Co, Cr, Mn and alloys thereof.

At least a portion of at least one of the inner surface and the outer surface of the tube of the multilayer tubular article of the invention advantageously comprises one or more functional groups.

The term "functional group" is used herein according to its usual meaning to denote a group of atoms linked to each other by covalent bonds.

At least a portion of at least one of the inner surface and the outer surface of the tube of the multilayer tubular article of the invention typically comprises one or more functional groups advantageously obtainable by a glow discharge process.

For the purpose of the present invention, the term "glow discharge process" is intended to denote a process powered by a radio-frequency amplifier wherein a glow discharge is generated by applying a voltage between two electrodes in a cell containing an etching gas medium. The glow discharge so generated is then typically transferred, commonly using a jet head, onto the surface of the material to be treated. Alternatively, the material to be treated is put between the electrodes in the cell containing the etching gas medium so that the glow discharge so generated is directly in contact with the surface of the material to be treated.

The glow discharge process typically comprises grafting one or more molecules onto at least a portion of at least one of the inner surface and the outer surface of the layer (Pc) of the tube of the multilayer tubular article of the invention.

For the purpose of the present invention, the term "grafting" is used according to its usual meaning to denote a radical process by which one or more functional groups are inserted onto the surface of a polymer backbone.

By "etching gas medium" it is hereby intended to denote either a gas or a mixture of gases suitable for use in a glow discharge process.

The glow discharge process is typically carried out in the presence of an etching gas medium comprising at least one gas selected from the group consisting of $N_2$, $NH_3$, $CH_4$, $CO_2$, He, $O_2$ and $H_2$.

The etching gas medium typically further comprises air.

The glow discharge process is preferably carried out in the presence of an etching gas medium comprising $N_2$ and/or $NH_3$, optionally, at least one gas selected from the group consisting of $H_2$ and He and, optionally, air.

According to an embodiment of the invention, the etching gas medium typically comprises $N_2$, preferably consists of:
from 5% to 95% by volume of $N_2$,
optionally, up to 15% by volume of $H_2$,
optionally, up to 95% by volume of He, and
optionally, up to 95% by volume of air.

The glow discharge process is typically carried out under reduced pressure or under atmospheric pressure.

The glow discharge process is preferably carried out under atmospheric pressure at about 760 Torr.

The glow discharge process may be carried out either under air or under modified atmosphere, e.g. under an inert gas, typically exempt notably from moisture (water vapour content of less than 0.001% v/v).

The glow discharge process is preferably carried out under air.

The glow discharge process is typically carried out at a radio-frequency comprised between 1 kHz and 100 kHz.

The glow discharge process is typically carried out at a voltage comprised between 1 kV and 50 kV.

The glow discharge process typically generates a plasma discharge.

The tube of the multilayer tubular article of the invention has an inner surface and an outer surface, wherein at least a portion of at least one of said inner surface and said outer surface typically comprises one or more functional groups comprising one or more atoms of an etching gas medium, preferably one or more N-containing functional groups.

Non-limiting examples of functional groups obtainable by a glow discharge process in the presence of an etching gas medium comprising, preferably consisting of, $N_2$ and/or $NH_3$, optionally, at least one gas selected from the group consisting of $H_2$ and He and, optionally, air, include, notably, N-containing functional groups such as amide groups ($-CONH_2$), amine groups ($-NH_2$), imine groups ($-CH=NH$) and nitrile groups ($-CN$).

The nature of the functional groups of at least a portion of at least one of the inner surface and the outer surface of the tube of the multilayer tubular article can be determined according to any suitable techniques such as, for instance, FT-IR techniques, preferably Attenuated Total Reflectance (ATR) coupled to FT-IR techniques, or X-ray induced photoelectron spectroscopy (XPS) techniques.

Should the layer (Mc) adhere to at least a portion of the inner surface of the tube of the multilayer tubular article of the invention, it is designated as inner layer (Mc).

Should the layer (Mc) adhere to at least a portion of the outer surface of the tube of the multilayer tubular article of the invention, it is designated as outer layer (Mc).

At least one layer (Mc) of the multilayer tubular article of the invention advantageously has a thickness comprised between 100 nm and 1 mm.

The thickness of the layer (Mc) of the multilayer tubular article can be measured according to any suitable techniques such as, for instance, scanning electron microscope (SEM) techniques or by using any suitable thickness gauges.

According to a first embodiment of the invention, the multilayer tubular article typically comprises:
a tube comprising, preferably consisting of, at least one layer (Pc), said tube having an inner surface and an outer surface, and
adhered to at least a portion of the inner surface of said tube, at least one inner layer (Mc).

According to a second embodiment of the invention, the multilayer tubular article typically comprises:
a tube comprising, preferably consisting of, at least one layer (Pc), said tube having an inner surface and an outer surface, and
adhered to at least a portion of the outer surface of said tube, at least one outer layer (Mc).

According to a third embodiment of the invention, the multilayer tubular article typically comprises:
a tube comprising, preferably consisting of, at least one layer (Pc), said tube having an inner surface and an outer surface,
adhered to at least a portion of the inner surface of said tube, at least one inner layer (Mc), and
adhered to at least a portion of the outer surface of said tube, at least one outer layer (Mc),
said outer layer (Mc) being equal to or different from said inner layer (Mc).

For the purpose of the present invention, each of the term "tube" and "tubular article" is intended to denote an article comprising one or more concentric layers.

For the purpose of the present invention, the term "layer" is intended to denote a sheet having a definite thickness, a definite length and a definite width, wherein the thickness is smaller than either of its length or its width.

For the purpose of the present invention, the term "concentric layer" is intended to denote a layer having the geometry of a hollow cylindrical body, said hollow cylindrical body having a definite height and a definite wall thickness, said wall thickness being equal to the difference between the outer diameter and the inner diameter of the hollow cylindrical body, said layer having a centre of mass in common with one or more other concentric layers.

For the purpose of the present invention, the expression "at least a portion", when referred to the surface of the tube, is to be understood to mean that embodiments wherein the tube has portions of its surface on which no compound (M) is adhered to are still encompassed by the present invention.

Nevertheless, it is generally understood that substantially the entire surface of the tube has adhered thereto at least one layer (Mc) as defined above.

In a second instance, the present invention pertains to a process for recovering one or more hydrocarbons, said process comprising:

(a) providing at least one multilayer tubular article comprising:

a tube comprising, preferably consisting of, at least one layer (Pc), said tube having an inner surface and an outer surface, and adhered to at least a portion of at least one of the inner surface and the outer surface of said tube, at least one layer (Mc); and (b) upstreaming a composition comprising one or more hydrocarbons through the at least one multilayer tubular article provided in step (a).

The multilayer tubular article provided in step (a) of the process for recovering one or more hydrocarbons is advantageously the multilayer tubular article of the present invention.

In a third instance, the present invention pertains to a process for manufacturing the multilayer tubular article of the invention.

According to a first embodiment of the invention, the process for manufacturing a multilayer tubular article typically comprises:

(1-a) providing a tube comprising at least one layer (Pc), said layer (Pc) having an inner surface and an outer surface;
(1-b) treating at least a portion of at least one of the inner surface and the outer surface of said at least one layer (Pc) of the tube provided in step (1-a) by a glow discharge process; and
(1-c) depositing by electroless plating at least one layer (Mc) on the treated inner surface and/or outer surface of said at least one layer (Pc) of the tube provided in step (1-b).

According to a variant of this first embodiment of the invention, the process for manufacturing a multilayer tubular article typically comprises:

(1-a) providing a tube comprising at least one layer (Pc), said layer (Pc) having an inner surface and an outer surface;
(1-b) treating at least a portion of at least one of the inner surface and the outer surface of said at least one layer (Pc) of the tube provided in step (1-a) by a glow discharge process;
(1-c) depositing by electroless plating at least one first layer (Mc) [layer (Mc-1)] on the treated inner surface and/or outer surface of said at least one layer (Pc) of the tube provided in step (1-b); and
(1-d) optionally, depositing by electrodeposition at least one second layer (Mc) [layer (Mc-2)] on the at least one layer (Mc-1) of the multilayer tubular article as provided in step (1-c), said layer (Mc-2) being equal to or different from said layer (Mc-1).

The multilayer tubular article obtainable by the process of this first embodiment of the invention is advantageously the multilayer tubular article of the present invention.

The multilayer tubular article obtainable by the process of this first embodiment of the invention is typically the multilayer tubular article according to any of the first, second and third embodiment of the present invention.

The tube provided in step (1-a) of the process of this first embodiment of the invention is typically obtainable by processing in molten phase a composition [composition (P)] comprising at least one polymer (T).

The skilled in the art will select and tune the proper processing parameters, including the temperature, as a function of the nature and the melting point of the polymer (T).

According to a second embodiment of the invention, the process for manufacturing a multilayer tubular article typically comprises:

(2-a) providing a tube comprising at least one layer (Pc), said layer (Pc) having an inner surface and an outer surface;
(2-b) providing a tape comprising, preferably consisting of:

at least one layer [layer (P)] consisting of a composition [composition (P)] comprising at least one polymer (T), said layer (P) having an inner surface and an outer surface, and adhered to at least a portion of the outer surface of said at least one layer (P), at least one layer [layer (M)] consisting of a composition [composition (M)] comprising at least one metal compound comprising one or more metals [compound (M)]; and (2-c) wrapping the tape provided in step (2-b) onto at least a portion of the outer surface of the tube provided in step (2-a).

The tube provided in step (2-a) of the process of this second embodiment of the invention is typically obtainable by processing in molten phase a composition [composition (P)] comprising at least one polymer (T).

The skilled in the art will select and tune the proper processing parameters, including the temperature, as a function of the nature and the melting point of the polymer (T).

Under step (2-a) of the process of this second embodiment of the invention, the tube so provided is typically maintained at a temperature above the melting point of the polymer (T).

The tape provided in step (2-b) of the process of this second embodiment of the invention is typically manufactured by a process comprising:

(3-a) treating at least a portion of the outer surface of at least one layer (P) by a glow discharge process; and
(3-b) depositing by electroless plating at least one layer (M) on the treated outer surface of said at least one layer (P) as provided in step (3-a).

Alternatively, the tape provided in step (2-b) of the process of this second embodiment of the invention is typically manufactured by a process comprising:

(3-a) treating at least a portion of the outer surface of at least one layer (P) by a glow discharge process;
(3-b) depositing by electroless plating at least one first layer (M) [layer (M-1)] on the treated outer surface of said at least one layer (P) as provided in step (3-a); and
(3-c) optionally, depositing by electrodeposition at least one second layer (M) [layer (M-2)] on the at least one layer (M-1) of the tape as provided in step (3-b), said layer (M-2) being equal to or different from said layer (M-1).

Under step (2-c) of the process of this second embodiment of the invention, the tape provided in step (2-b) is advantageously adhered to at least a portion of the outer surface of the tube provided in step (2-a).

Under step (2-c) of the process of this second embodiment of the invention, the tape provided in step (2-b) is typically adhered by melt bonding to at least a portion of the outer surface of the tube provided in step (2-a).

Under step (2-c) of the process of this second embodiment of the invention, the inner surface of at least one layer (P) of the tape provided in step (2-b) is advantageously adhered to at least a portion of the outer surface of the tube provided in step (2-a).

Under step (2-c) of the process of this second embodiment of the invention, the inner surface of at least one layer (P) of the tape provided in step (2-b) is typically adhered by melt bonding to at least a portion of the outer surface of the tube provided in step (2-a).

The multilayer tubular article obtainable by the process of this second embodiment of the invention is advantageously the multilayer tubular article of the present invention.

The multilayer tubular article obtainable by the process of this second embodiment of the invention is typically the multilayer tubular article according to any of the second and third embodiment of the present invention.

Under step (1-b) of the process for manufacturing a multilayer tubular article according to the first embodiment of the invention, the treated inner surface and/or outer surface of at least one layer (Pc) of the tube provided in step (1-a) typically comprises one or more functional groups comprising one or more atoms of an etching gas medium, preferably one or more N-containing functional groups.

Similarly, under step (3-a) of the process for manufacturing the tape provided in step (2-b) of the process for manufacturing a multilayer tubular article according to the second embodiment of the invention, the treated outer surface of at least one layer (P) typically comprises one or more functional groups comprising one or more atoms of an etching gas medium, preferably one or more N-containing functional groups.

Non-limiting examples of functional groups obtainable by a glow discharge process in the presence of an etching gas medium comprising $N_2$ and/or $NH_3$, optionally, at least one gas selected from the group consisting of $H_2$ and He and, optionally, air, include, notably, N-containing functional groups such as amide groups (—$CONH_2$), amine groups (—$NH_2$), imine groups (—CH=NH) and nitrile groups (—CN).

The Applicant has found that, after treatment by a glow discharge process in the presence of an etching gas medium, the treated inner surface and/or outer surface of the tube of the multilayer tubular article of the invention successfully maintains its bulk properties including its mechanical properties.

The Applicant has also found that, after treatment by a glow discharge process in the presence of an etching gas medium, the layer (Mc) is successfully adhered to at least one of the treated inner surface and/or the outer surface of the tube of the multilayer tubular article of the invention.

For the purpose of the present invention, by "electroless plating" it is meant a process carried out in an electrochemical cell, typically in a plating bath comprising at least one metal salt, wherein the metal cation of the metal salt is reduced from its oxidation state to its elemental state in the presence of suitable chemical reducing agents.

The plating bath typically comprises at least one metal salt, at least one organic solvent [solvent (S)] and at least one reducing agent [agent (R)].

The metal salt is typically a salt of a compound (M).

The solvent (S) is typically selected from the group consisting of:
aliphatic, cycloaliphatic or aromatic ether oxides, more particularly, diethyl oxide, dipropyl oxide, diisopropyl oxide, dibutyl oxide, methyltertiobutylether, dipentyl oxide, diisopentyl oxide, ethylene glycol dimethyl ether, ethylene glycol diethyl ether, ethylene glycol dibutyl ether benzyl oxide; dioxane, tetrahydrofuran (THF),
glycol ethers such as ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether, diethylene glycol mono-n-butyl ether,
glycol ether esters such as ethylene glycol methyl ether acetate, ethylene glycol monoethyl ether acetate, ethylene glycol monobutyl ether acetate,
alcohols such as methyl alcohol, ethyl alcohol, diacetone alcohol,
ketones such as acetone, methylethylketone, methylisobutyl ketone, diisobutylketone, cyclohexanone, isophorone, and
linear or cyclic esters such as: isopropyl acetate, n-butyl acetate, methyl acetoacetate, dimethyl phthalate, g-butyrolactone.

The agent (R) is typically selected from the group consisting of formaldehyde, hydrazine and sodium hypophosphite.

Under step (1-c) of the process for manufacturing a multilayer tubular article according to the first embodiment of the invention, electroless plating typically comprises:
contacting at least a portion of at least one of the inner surface and the outer surface of at least one layer (Pc) of the tube provided in step (1-a) with an electroless metallization catalyst thereby providing a catalytic surface; and
contacting the catalytic surface so obtained with a plating bath.

Similarly, under step (3-b) of the process for manufacturing the tape provided in step (2-b) of the process for manufacturing a multilayer tubular article according to the second embodiment of the invention, electroless plating of the treated outer surface of at least one layer (P) typically comprises:
contacting at least a portion of the outer surface of at least one layer (P) with an electroless metallization catalyst thereby providing a catalytic surface; and
contacting the catalytic surface so obtained with a plating bath.

The electroless metallization catalyst is typically selected from the group consisting of catalysts derived from palladium, platinum, rhodium, iridium, nickel, copper, silver and gold.

The electroless metallization catalyst is preferably selected from catalysts derived from palladium such as $PdCl_2$.

The multilayer tubular article of the invention typically comprises:
a tube comprising, preferably consisting of, at least one layer (Pc), said tube having an inner surface and an outer surface, and
adhered to at least a portion of at least one of the inner surface and the outer surface of said tube, at least one layer (Mc),
wherein said at least one layer (Mc) is advantageously obtainable by electroless plating.

Alternatively, the multilayer tubular article of the invention typically comprises:
a tube comprising, preferably consisting of, at least one layer (Pc), said tube having an inner surface and an outer surface,
adhered to at least a portion of at least one of the inner surface and the outer surface of said tube, at least one first layer (Mc) [layer (Mc-1)], and
optionally, adhered to at least a portion of the at least one layer (Mc-1), at least one second layer (Mc) [layer (Mc-2)], said layer (Mc-2) being equal to or different from said layer (Mc-1), wherein said at least one layer (Mc-1) is advantageously obtainable by electroless plating and said at least one layer (Mc-2), if any, is advantageously obtainable by electrodeposition.

For the purpose of the present invention, by "electrodeposition" it is meant a process carried out in an electrolytic cell wherein electrons flow through an electrolytic composition comprising at least one metal salt from a positive electrode to a negative electrode thereby causing the inorganic anion of the metal salt to be oxidised at the positive electrode and the metal cation of the metal salt to be reduced at the negative electrode so that a layer consisting of a metal in its elemental state is deposited onto said negative electrode.

For the purpose of the present invention, the term "positive electrode" is intended to denote the anode where oxidation takes place. For the purpose of the present invention, the term "negative electrode" is intended to denote the cathode where reduction takes place.

The layer (Mc-1) of the multilayer tubular article as provided in step (1-c) of the process of the invention typically operates as a negative electrode.

Similarly, the layer (M-1) of the tape as provided in step (3-b) of the process of the invention typically operates as a negative electrode.

The electrodeposition may be carried out either under inert atmosphere or under air atmosphere. The electrodeposition is advantageously carried out under air atmosphere.

The electrodeposition is typically carried out at a temperature of at most 120° C. The electrodeposition is typically carried out at a temperature of at least 20° C.

In a fourth instance, the present invention pertains to use of the multilayer tubular article of the invention in upstream applications, in particular in upstream applications for conveying hydrocarbons from a well to a floating off-shore unit via a bottom platform.

According to a first embodiment of the invention, the multilayer tubular article of the invention is suitable for use as flexible pipe.

The flexible pipe of the invention is particularly suitable for use in upstream applications for conveying hydrocarbons from a bottom platform to a floating off-shore unit.

For the purpose of the present invention, the term "flexible pipe" is intended to denote a flexible tubular pipe comprising polymer concentric layers providing sealing against the outer environment and metal reinforcements providing mechanical resistance under high internal and external pressures.

The multilayer tubular article of any of the second and third embodiment of the invention is particularly suitable for use as flexible pipe.

According to a first variant of this first embodiment of the invention, the multilayer tubular article is free from a metal carcass.

A multilayer tubular article suitable for use as flexible pipe according to this first variant of this first embodiment of the invention typically comprises:
- a tube comprising, preferably consisting of, at least one layer (Pc), said tube having an inner surface and an outer surface, and
- adhered to at least a portion of the outer surface of said tube, at least one outer layer (Mc).

A multilayer tubular article suitable for use as flexible pipe according to this first variant of this first embodiment of the invention preferably comprises:
- a tube comprising, preferably consisting of, at least one layer (Pc), said tube having an inner surface and an outer surface, and
- adhered to at least a portion of the outer surface of said tube, at least one outer layer (Mc), said at least one outer layer (Mc) being surrounded by
- a pressure armour, said pressure armour being surrounded by
- a tensile armour.

A multilayer tubular article suitable for use as flexible pipe according to this first variant of this first embodiment of the invention may further comprise, adhered to at least a portion of the inner surface of the tube, at least one inner layer (Mc), said inner layer (Mc) being equal to or different from said outer layer (Mc).

According to a second variant of this first embodiment of the invention, the multilayer tubular article further comprises a metal carcass.

A multilayer tubular article suitable for use as flexible pipe according to this second variant of this first embodiment of the invention typically comprises:
- a metal carcass, said metal carcass being surrounded by
- a tube comprising, preferably consisting of, at least one layer (Pc), said tube having an inner surface and an outer surface, and
- adhered to at least a portion of the outer surface of said tube, at least one outer layer (Mc).

A multilayer tubular article suitable for use as flexible pipe according to this second variant of this first embodiment of the invention preferably comprises:
- a metal carcass, said metal carcass being surrounded by
- a tube comprising, preferably consisting of, at least one layer (Pc), said tube having an inner surface and an outer surface, and
- adhered to at least a portion of the outer surface of said tube, at least one outer layer (Mc), said at least one outer layer (Mc) being surrounded by
- a pressure armour, said pressure armour being surrounded by
- a tensile armour.

One or more intermediate sheaths acting as anti-wear layers may be provided between the pressure armour and the tensile armour of a multilayer tubular article suitable for use as flexible pipe according to this first embodiment of the invention.

A multilayer tubular article suitable for use as flexible pipe according to this first embodiment of the invention may further comprise an outer sheath, preferably an outer sheath consisting of at least one layer (Pc).

According to a second embodiment of the invention, the multilayer tubular article of the invention is suitable for use as pipe liner for downhole pipes.

The downhole pipe of the invention is particularly suitable for use in upstream applications for conveying hydrocarbons from a well to a bottom platform.

The multilayer tubular article of any of the first and third embodiment of the invention is particularly suitable for use as pipe liner for downhole pipes.

A multilayer tubular article suitable for use as pipe liner for downhole pipes according to this second embodiment of the invention typically comprises:
- a tube comprising, preferably consisting of, at least one layer (Pc), said tube having an inner surface and an outer surface, and
- adhered to at least a portion of the inner surface of said tube, at least one inner layer (Mc).

A multilayer tubular article suitable for use as pipe liner for downhole pipes according to this second embodiment of the invention may further comprise, adhered to at least a portion of the outer surface of said tube, at least one outer layer (Mc), said outer layer (Mc) being equal to or different from said inner layer (Mc).

The multilayer tubular article of the invention is particularly suitable for use in a process for manufacturing a downhole pipe.

The process for manufacturing a downhole pipe typically comprises lining a metal pipe using the multilayer tubular article of the invention.

Thus, in a fifth instance, the present invention pertains to a process for manufacturing a downhole pipe, said process comprising:
(4-a) providing a metal pipe;
(4-b) providing a multilayer tubular article comprising:
   a tube comprising, preferably consisting of, at least one layer (Pc), said tube having an inner surface and an outer surface, and
   adhered to at least a portion of the inner surface of said tube, at least one inner layer (Mc),
said multilayer tubular article having an outer diameter higher than the inner diameter of the metal pipe;
(4-c) compressing the multilayer tubular article provided in step (4-b) thereby providing a compressed multilayer tubular article, said compressed multilayer tubular article having an outer diameter lower than the inner diameter of the metal pipe;
(4-d) inserting the compressed multilayer tubular article provided in step (4-c) into the metal pipe provided in step (4-a); and
(4-e) expanding the compressed multilayer tubular article provided in step (4-d) so as to fit the inner diameter of the metal pipe.

Under step (4-b) of the process for manufacturing a downhole pipe, the multilayer tubular article may further comprise, adhered to at least a portion of the outer surface of the tube, at least one outer layer (Mc), said outer layer (Mc) being equal to or different from said inner layer (Mc).

Under step (4-b) of the process for manufacturing a downhole pipe, the multilayer tubular article may have a length equal to or different from the length of the metal pipe provided in step (4-a).

Under step (4-a) of the process for manufacturing a downhole pipe, the metal pipe is usually a pipe consisting of iron or steel, preferably a pipe consisting of steel such as carbon, alloy or stainless steel.

According to an embodiment of the process for manufacturing a downhole pipe, the metal pipe may be a damaged metal pipe. Should the metal pipe be a damaged metal pipe, the process of the invention is a process for rehabilitating such a metal pipe, said process comprising lining a metal pipe using the multilayer tubular article of the invention.

Under step (4-c) of the process for manufacturing a downhole pipe, the multilayer tubular article is typically compressed by reducing its cross-sectional area by means of radial or axial compression.

Techniques for compressing a multilayer tubular article to enable it to be inserted in a metal pipe are well known in the art.

Under step (4-c) of the process for manufacturing a downhole pipe, the multilayer tubular article provided in step (4-b) may be compressed by means of radial compression typically using sets of compression rollers.

Non-limiting examples of this type of processing include the technique known as Roll Down.

Alternatively, under step (4-c) of the process for manufacturing a downhole pipe, the multilayer tubular article provided in step (4-b) may be compressed by means of axial compression typically pulling the multilayer tubular article through a diameter reducing die. The diameter reduction is only achieved so long as the axial tension on the multilayer tubular article is maintained. Non-limiting examples of this type of processing include the techniques known as Swagelining, Die-drawing and Titeliner.

Yet, under step (4-c) of the process for manufacturing a downhole pipe, the multilayer tubular article provided in step (4-b) may be compressed by folding or collapsing into a U-shaped or a C-shaped cross section.

Under step (4-e) of the process for manufacturing a downhole pipe, the compressed multilayer tubular article provided in step (4-d) is expanded so as to fit the inner diameter of the metal pipe typically by elastic recovery.

Alternatively, under step (4-e) of the process for manufacturing a downhole pipe, the compressed multilayer tubular article provided in step (4-d) is expanded so as to fit the inner diameter of the metal pipe typically by heat and/or pressurisation with oils and gases.

For the purpose of the present invention, the term "elastic" is intended to denote a temporary and reversible deformation.

A multilayer tubular article suitable for use as downhole pipe according to this second embodiment of the invention typically comprises:
   a metal pipe, said metal pipe having an inner surface and an outer surface, and
   fit to at least a portion of the inner surface of said metal pipe, a tube comprising, preferably consisting of, at least one layer (Pc), said tube having an inner surface and an outer surface, and
   adhered to at least a portion of the inner surface of said tube, at least one inner layer (Mc).

A multilayer tubular article suitable for use as downhole pipe according to this second embodiment of the invention may further comprise, adhered to at least a portion of the inner surface of said metal pipe and to at least a portion of the outer surface of said tube, at least one outer layer (Mc), said outer layer (Mc) being equal to or different from said inner layer (Mc).

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Film consisting of ECTFE (E: 50% by moles; CTFE: 50% by moles) [ECTFE-1] having a thickness of 50 μm.

Circular sample of a VDF polymer [PVDF-1] with a diameter of 50 mm having a thickness of 6 mm.

Measurement of Permeability Properties

Water vapour permeability was measured according to ASTM F1249 standard test procedure by means of the Water Vapor Transmission Rate (WVTR). The WTR represents the volume of water vapour that passes through a unit thickness of material per unit area per unit time per unit barometric pressure. The WVTR was measured at 90° C. or 120° C. at a relative humidity of 90%.

Hydrogen sulphide, carbon dioxide and methane permeability coefficients were measured according to ASTM D1434 standard test procedure. The permeability coefficient represents the volume of gas that passes through a unit thickness of material per unit area per unit time per unit barometric pressure. Gas which permeates through the specimen is determined by the increase in pressure on the lower-pressure side and the composition is determined by gas chromatography. Permeability coefficients were measured at 120° C. under a pressure of 100 bar in a mixture of gas and water: $CH_4/CO_2/H_2S$ 85/5/10% by moles and 400 μm water.

Measurement of Adhesion Strength

The adhesion strength between the layer (Mc) and the layer (Pc) of the tube of the multilayer tubular articles of the invention was measured according to ASTM D3359 standard procedure. Using a cutting tool, two series of perpendicular cuts were performed on the metallic layer of the tapes obtained according to either Example 1 or Example 2 thereby providing a lattice pattern thereon. A piece of an adhesive label was then applied over the lattice and removed with an angle of 180° with respect to the metallic layer.

The classification of test results ranged from 5B to 0B, whose descriptions are depicted in Table 1 here below:

TABLE 1

| ASTM D3359 Classification | Description |
|---|---|
| 5B | The edges of the cuts are completely smooth; none of the squares of the lattice is detached. |
| 4B | Detachment of flakes of the coating at the intersections of the cuts. A cross cut area not significantly greater than 5% is affected. |
| 3B | The coating has flaked along the edges and/or at the intersection of the cuts. A cross cut area significantly greater than 5%, but not significantly greater than 15% is affected. |
| 2B | The coating has flaked along the edges of the cuts partly or wholly in large ribbons, and/or it has flaked partly of wholly on different parts of the squares. A cross cut area significantly greater than 15%, but not significantly greater than 65%, is affected. |
| 1B | The coating has flaked along the edges of the cuts in large ribbons and/or some squares have detached partly or wholly. A cross cut area significantly greater than 35%, but not significantly greater than 65%, is affected. |
| 0B | Any degree of flaking that cannot be classified even by classification 1B. |

EXAMPLE 1—MANUFACTURE OF A TAPE

1-A—Surface Modification

One surface of the film of ECTFE-1 was treated at atmospheric pressure by a radio-frequency plasma discharge process. The etching gas was a mixture of $N_2$ (95% by volume) and $H_2$ (5% by volume). The working frequency was 40 kHz and the voltage was 20 kV.

A sample (20 mm×30 mm) of the treated surface of the film of ECTFE-1 so obtained was analysed by ATR-FTIR using a Ge crystal with a resolution of 2 $cm^{-1}$ and 256 scans.

The results were compared by performing spectral subtraction between the spectra obtained for the treated surface of the film of ECTFE-1 obtained according to Example 1-A and the spectra obtained for the untreated film of ECTFE-1 obtained according to Comparative Example 1: weak bands were observed in the region of about 3300 $cm^{-1}$ and from 1680 $cm^{-1}$ to 1500 $cm^{-1}$, which were compatible with the presence of chemical groups containing nitrogen atoms like amide groups ($—CONH_2$), amine groups ($—NH_2$), imine groups (—CH=NH) and nitrile groups (—CN).

1-B—Metallization Process

The treated surface of the film of ECTFE-1 obtained according to Example 1-A was coated with metallic copper by electroless plating. Prior to copper deposition, the treated surface of the film of ECTFE-1 was activated by immersion in an aqueous solution containing 0.03 g/L of $PdCl_2$ for 1 minute, resulting in the treated surface of the film of ECTFE-1 being entirely coated with Pd particles at a high density. The so activated surface of the film of ECTFE-1 was then immersed in an aqueous plating bath containing 10 g/L of $CuSO_4$ and 0.01 g/L of formaldehyde. The plating temperature was 25° C. and its pH value was 4.

The thickness of the copper layer coated onto the treated surface of the film of ECTFE-1 was 0.5 μm, as measured by SEM.

EXAMPLE 2—MANUFACTURE OF A TAPE

2-A—Metallization Process

The tape obtained according to Example 1 was further coated with metallic nickel by electrodeposition using an electrolyte medium containing Ni sulfate and Ni chloride, boric acid and organic additives. The plating bath was heated at 45° C. and mechanically stirred during the process. Electrodeposition was performed in galvanostatic conditions at 10 $mA/cm^2$.

The thickness of the nickel layer coated onto the tape obtained according to Example 1-B was 20 μm, as measured by SEM.

Comparative Example 1

The film consisting of ECTFE-1 as such having a thickness of 50 μm was tested.

As shown in Table 2 here below, the tapes obtained according to either Example 1 or Example 2 of the invention successfully exhibited high adhesion strength and low permeability to both water vapour at 90° C. and to nitrogen at 120° C. as compared to the untreated film of ECTFE-1 of Comparative Example 1:

TABLE 2

| Run | WVTR [cm3 (STP) · mm/m2 · atm · day] | Adhesion strength |
|---|---|---|
| Ex. 1 | Water vapour (90° C.): 80 Nitrogen (120° C.): <10 | 5B |
| Ex. 2 | Water vapour (90° C.): <10 Nitrogen (120° C.): <10 | 5B |
| C. Ex. 1 | Water vapour (90° C.): 7700 Nitrogen (120° C.): 280 | Not applicable |

EXAMPLE 3—MANUFACTURE OF A TAPE

3-A—Surface Modification

One surface of PVDF-1 was treated at atmospheric pressure by a radio-frequency plasma discharge process. The etching gas was a mixture of $N_2$ (95% by volume) and $H_2$ (5% by volume). The working frequency was 40 kHz and the voltage was 20 kV.

3-B—Metallization Process

The treated surface of PVDF-1 obtained according to Example 3-A was coated with metallic nickel by electroless plating. Prior to nickeldeposition, the treated surface of PVDF-1 was activated by immersion in an aqueous solution containing 0.03 g/L of $PdCl_2$ for 1 minute, resulting in the treated surface of PVDF-1 being entirely coated with Pd particles at a high density. The so activated surface of PVDF-1 was then immersed in an aqueous plating bath containing 90 g/L of $NiSO_4$, boric acid and organic additives. The plating temperature was 90° C. and its pH value was 4. The thickness of the nickel layer coated onto the treated surface of PVDF-1 was 0.15 μm, as measured by SEM.

Comparative Example 2

The sample consisting of PVDF-1 as such having a thickness of 6 mm was tested.

As shown in Table 3 here below, the sample obtained according to Example 3 of the invention successfully exhibited lower permeability to hydrogen sulphide, carbon dioxide and methane at 120° C. as compared to the untreated sample of PVDF-1 of Comparative Example 2:

TABLE 3

| Coefficient Permeability [cm3 · cm/s · cm2 · bar] | Ex. 3 | C. Ex. 2 |
|---|---|---|
| $H_2S$ | $5.8 \times 10^{-8}$ | $12 \times 10^{-8}$ |
| $CO_2$ | $6.5 \times 10^{-8}$ | $14 \times 10^{-8}$ |
| $CH_4$ | $5.9 \times 10^{-8}$ | $13 \times 10^{-8}$ |

The invention claimed is:

1. A process for recovering one or more hydrocarbons, said process comprising:
   upstreaming a composition comprising one or more hydrocarbons through at least one multilayer tubular article, the article comprising:
      a tube comprising at least one concentric layer (Pc) consisting of a composition (P) comprising at least one thermoplastic polymer (T),
   said tube having an inner surface and an outer surface, wherein at least a portion of at least one of the inner surface and the outer surface of the tube comprises one or more functional groups, and
      adhered to at least a portion of at least one of the inner surface and the outer surface of said tube, at least one concentric layer (Mc) consisting of a composition (M) comprising at least one metal compound comprising one or more metals [compound (M)];
   wherein the multilayer tubular article is manufactured by a process comprising:
      (1-a) providing the tube comprising the at least one layer (Pc);
      (1-b) treating at least a portion of at least one of the inner surface and the outer surface of the at least one layer (Pc) of the tube provided in step (1-a) by a glow discharge process, thus forming a treated inner surface and/or outer surface; and
      (1-c) depositing by electroless plating the at least one layer (Mc) on the treated inner surface and/or outer surface.

2. The process according to claim 1, wherein the at least one layer (Mc) is adhered to at least a portion of the inner surface of said tube, forming at least one inner layer.

3. The process according to claim 1, wherein the at least one layer (Mc) is
   adhered to at least a portion of the outer surface of said tube, forming at least one outer layer.

4. The process according to claim 1, wherein at least one of the at least one layer (Mc) is adhered to at least a portion of the inner surface of said tube, forming at least one inner layer, and at least one additional at least one layer (Mc) is adhered to at least a portion of the outer surface of said tube, forming at least one outer layer,
   said outer layer being equal to or different from said inner layer.

5. The process according to claim 1, wherein at least a portion of at least one of the inner surface and the outer surface of the tube of the multilayer tubular article comprises one or more N-containing functional groups.

6. The process according to claim 1, wherein the polymer (T) is a fluoropolymer [polymer (F)].

7. The process according to claim 6, wherein polymer (F) is selected from the group consisting of:
   polymers (F-1) comprising recurring units derived from vinylidene fluoride (VDF) and, optionally, at least one monomer (F) different from VDF,
   polymers (F-2) comprising recurring units derived from at least one monomer (F) selected from tetrafluoroethylene (TFE) and chlorotrifluoroethylene (CTFE), at least one monomer (H) selected from ethylene (E), propylene and isobutylene and, optionally, at least one monomer (F) different from TFE and/or CTFE, and
   polymers (F-3) comprising recurring units derived from tetrafluoroethylene (TFE) and at least one monomer (F) selected from the group consisting of perfluoroalkylvinylethers of formula $CF_2=CFOR_{f1'}$, wherein $R_{f1'}$ is a $C_1$-$C_6$ perfluoroalkyl group, and $C_3$-$C_8$ perfluoroolefins.

8. The process according to claim 7, wherein, in polymers (F-2), the at least one monomer (F) different from TFE and/or CTFE is present in an amount of from 0.01% to 30% by moles, based on the total amount of TFE, CTFE and monomer (H).

9. The process according to claim 1, wherein the at least one layer (Mc) of the at least one multilayer tubular article has a thickness comprised between 100 nm and 1 mm.

10. The process according to claim 1, wherein the process for manufacturing the multilayer tubular article further comprises
    providing a tape comprising:
       at least one layer (P) consisting of a composition (P), wherein composition (P) comprises at least one polymer (T), said layer (P) having an inner surface and an outer surface, and
       adhered to at least a portion of the outer surface of said at least one layer (P), at least one layer (M) consisting of a composition (M), wherein composition (M) comprises at least one metal compound comprising one or more metals [compound (M)]; and
    wrapping the tape onto at least a portion of the outer surface of the tube.

11. The process according to claim 10, wherein the tape manufactured by a process comprising:
    (3-a) treating at least a portion of the outer surface of at least one layer (P) by a glow discharge process; and
    (3-b) depositing by electroless plating at least one layer (M) on the treated outer surface of said at least one layer (P) as provided in step (3-a).

12. The process according to claim 1, wherein the glow discharge process is carried out in the presence of an etching gas medium.

13. The process according to claim 12, wherein the etching gas medium comprises at least one gas selected from the group consisting of $N_2$, $NH_3$, $CH_4$, $CO_2$, He, $O_2$ and $H_2$.

14. The process according to claim 13, wherein the etching gas medium further comprises air.

15. The process according to claim 12, wherein the etching gas medium comprises $N_2$.

16. The process according to claim 15, wherein the etching gas medium consists of:
from 5% to 95% by volume of $N_2$,
optionally, up to 15% by volume of $H_2$,
optionally, up to 95% by volume of He, and
optionally, up to 95% by volume of air.

* * * * *